United States Patent Office 3,449,401
Patented June 10, 1969

3,449,401
PRODUCTION OF ACRYLONITRILE
Robert J. Evans, Jacksonville, Ill., and Keith M. Taylor, Ballwin, Mo., assignors to Monsanto Company, St. Louis, Mo., a corporation of Delaware
No Drawing. Filed Dec. 27, 1966, Ser. No. 604,627
Int. Cl. C07c *121/02, 121/32, 121/06*
U.S. Cl. 260—465.9                10 Claims

ABSTRACT OF THE DISCLOSURE

Acrylonitrile is produced in a noncatalytic process by contacting acetonitrile and an alkyl halide containing less than 20 carbon atoms per molecule.

---

The present invention relates to a process for the production of acrylonitrile. More, particularly, the present invention relates to a new and novel noncatalytic process for the direct synthesis of acrylonitrile from acetonitrile and certain alkyl halides, particularly the alkyl iodides and alkyl chlorides.

Acrylonitrile is among the most valuable monomers available to the polymer industry for producing useful polymeric products. This valuable monomer is used in the preparation of synthetic fibers, synthetic rubbers and for other useful plastic products. Presently, most of the acrylonitrile is produced by such catalytic processes as the catalytic reaction of acetylene and hydrogen cyanide and the reaction of ammonia and propylene. While the known catalytic processes have proven very effective in producing acrylonitrile, the demand for acrylonitrile is so great as to make desirable the development of new and additional processes for producing acrylonitrile. Also, in general, the catalysts most often used in acrylonitrile production are relatively expensive in cost and handling. For these and other reasons, it would be advantageous to have means of producing acrylonitrile without the use of a catalyst.

It is an object of the present invention to provide a new and novel process for the production of acrylonitrile. Another object of the present invention is to provide a new and novel noncatalytic process for the production of acrylonitrile. An additional object of the present invention is to provide a new and novel process for the production of acrylonitrile by the noncatalytic direct reaction of acetonitrile with alkyl iodides and/or alkyl chlorides. Additional objects will become apparent from the following description of the invention herein disclosed.

The present invention, which fulfills these and other objects, is a process for the preparation of acrylonitrile which comprises subjecting acetonitrile and an alkyl halide selected from the group consisting of alkyl iodides and alkyl chlorides to a temperature within the range of 750 to 1000° C. for a period of 0.1 to 20 seconds in the absence of a catalyst. By this process, significant quantities of acrylonitrile are produced. Further, the acrylonitrile is produced without the aid of a catalyst. Since no catalyst is required, the present process results in a reduction of the expense required for catalyst purchase and handling.

In order to further describe as well as to demonstrate the present invention, the following examples are presented. These examples are not to be construed as in any manner limiting the present invention.

EXAMPLE I

A mixture of substantially equimolar quantities of acetonitrile and methyl iodide was passed through a reactor tube having a length of 12 inches and an internal diameter of one inch. Nitrogen, as an inert diluent, was introduced into the reactor tube concurrently with the mixture of acetonitrile and methyl iodide. The temperature within the reaction tube was approximately 800° C. and the residence time of the reactants within the reaction zone was 3 seconds. Pressure within the reaction zone was essentially atmospheric pressure. The effluent from the reactor tube was passed through a condenser and a liquid product obtained. This liquid product was found to contain 8% by weight of acrylonitrile with the remainder of the liquid product being primarily unreacted acetonitrile and methyl iodide.

EXAMPLE II

Example I was substantially repeated with the exception that the temperature was 900° C. On analysis, the liquid product of this run was found to contain approximately 11% by weight acrylonitrile, the majority of the remainder of the liquid product being unreacted acetonitrile and methyl iodide.

EXAMPLE III

Example I was substantially repeated with the exception that the temperature was 950° C. and the mole ratio was 1:3, methyl iodide to acetonitrile. The liquid product was found to contain approximately 24.5% by weight acrylonitrile, the remainder of the liquid product being primarily unreacted acetonitrile and methyl iodide.

EXAMPLE IV

Example II was substantially repeated with the exception that the alkyl halide was methyl chloride and the residence time was approximately 2.5 seconds. The liquid product was found to contain 8% by weight acrylonitrile, the remainder of the liquid product being primarily unreacted acetonitrile and methyl chloride.

EXAMPLE V

Example IV was substantially repeated with the exception that the temperature was 950° C. The liquid product was found to contain 10% by weight acrylonitrile, the remainder of the liquid product being primarily unreacted acetonitrile and methyl chloride.

EXAMPLE VI

Example II is substantially repeated with the exception that the alkyl halide is ethyl iodide. The liquid product is found to contain acrylonitrile in significant quantity as the principal reaction product, the remainder of the liquid product being primarily unreacted acetonitrile and ethyl iodide.

EXAMPLE VII

Example II is substantially repeated with the exception that the alkyl halide is n-butyl chloride. The liquid product is found to contain acrylonitrile in significant quantity as the principal reaction product, the remainder of the liquid product being primarily unreacted acetonitrile and n-butyl chloride.

From the above examples, it is readily noted that the present invention represents a means to produce significant quantities of acrylonitrile without the use of a catalyst.

The alkyl halide reactants of the process of the present invention are the alkyl chlorides and alkyl iodides. The alkyl radical of these alkyl halides may be straight chain, branched chain or cyclic and may vary from one carbon atom to as high as 20 carbon atoms and higher. Among these alkyl halides are such compounds as methyl iodide, methyl chloride, ethyl iodide, ethyl chloride, propyl iodides, propyl chlorides, butyl iodides, butyl chlorides, pentyl iodides, pentyl chlorides, hexyl iodides, heptyl chlorides, octyl iodides, nonyl chlorides, and the like. The most useful of the alkyl halides for the operation of the process of the present invention are those having no greater than 10 carbon atoms. Preferably, the alkyl halides have 1 to 4 carbon atoms. Also, it is somewhat preferred that the alkyl halide be an alkyl iodide.

The temperatures at which the process of the present invention is operated, generally, are within the range of 750 to 1000° C. At temperatures below 750° C., reaction is below practical limitations. Above 1000° C., cracking of the reactants becomes excessive. Within the above defined temperature range, it has been found that the optimum reaction temperature decreases slightly with the increase in molecular weight of the alkyl halide. In the preferred practice of the process of the present invention, temperatures within the range of 850 to 975° C. are most often used.

The pressure at which the process of the present invention is operated in not particularly critical and may be varied over wide ranges. The pressure may be subatmospheric, atmospheric or superatmospheric. Most often, the pressure at which the process of the present invention is operated will be within the range of 5 to 100 p.s.i.a. As a practical matter, the present invention is usually operated at or near atmospheric pressure, i.e., 14.5 to 20 p.s.i.a.

In operating the present process, the residence time of the acetonitrile anl alkyl halide within the reaction zone most often is within the range of 0.1 to 20 seconds. The optimum residence time will vary according to temperatures, lower residence time being used with higher temperatures and conversely, longer residence times being used with lower temperatures. In the preferred practice of the process of the present invention, a residence time of 1 to 10 seconds is most often employed.

In carrying out the process of the present invention, it is often desirable to carry out the reaction of the acetonitrile and alkyl halide in the presence of a diluent. Such a diluent is inert to the chemical reaction taking place within the reaction zone. Exemplary of materials which may be used as diluents are nitrogen, helium, argon, carbon dioxide and the like. Among the preferred diluents are nitrogen and argon. When a diluent is used, it may be used in practically any concentration. However, as a practical matter, the diluent is most often present in a mol ratio of diluent to combined acetonitrile and alkyl halide within the range of 0.25:1 to 3:1.

The acetonitrile and the alkyl halide most often are introduced into the reaction zone in a molar ratio of acetonitrile to alkyl halide within the range of 10:1 to 1:10. The preferred mol ratio will vary to some extent with the molecular weight of the alkyl halide employed. In a general sense, it may be said that higher ratios of acetonitrile to alkyl halide may be used as the molecular weight of the hydrocarbon increases. With the preferred alkyl halides, herein above defined, acetonitrile to alkyl halide mol ratios within the range of 6:1 to 1:6 are usually employed in the practice of the present invention.

What is claimed is:
1. A process for the preparation of acrylonitrile which comprises subjecting acetonitrile and an alkyl halide selected from the group consisting of alkyl iodides and alkyl chlorides, having 1 to 20 carbon atoms per molecule, to a temperature within the range of 750 to 1000° C. for a period of 0.1 to 20 seconds in the absence of a catalyst.
2. The process of claim 1 wherein the mol ratio of acetonitrile and alkyl halide is within the range of 10:1 to 1:10.
3. The process of claim 2, wherein the alkyl halide is methyl iodide.
4. The process of claim 1, wherein the temperature is within the range of 850 to 975° C.
5. The process of claim 1, wherein the pressure is within the range of 5 to 100 p.s.i.a.
6. The process of claim 1, wherein the residence time is within the range of 1 to 10 seconds.
7. The process of claim 1, wherein the acetonitrile and alkyl halide are subjected to the reaction conditions in the presence of an inert diluent.
8. The process of claim 7, wherein the inert diluent is selected from the group consisting of nitrogen, helium, argon, carbon dioxide and mixtures thereof.
9. The process of claim 1, wherein the alkyl halide is an alkyl iodide.
10. The process of claim 1, wherein the alkyl halide is an alkyl chloride.

References Cited
UNITED STATES PATENTS 3,055,738   9/1962   Krebaum.

JOSEPH P. BRUST, *Primary Examiner.*